United States Patent
Tsukamoto (10) Patent No.: US 9,743,335 B2
(45) Date of Patent: Aug. 22, 2017

(54) MOBILE STATION, BASE STATION, WIRELESS COMMUNICATION SYSTEM, AND COMMUNICATION METHOD

(71) Applicant: MITSUBISHI ELECTRIC CORPORATION, Chiyoda-ku (JP)

(72) Inventor: Kaoru Tsukamoto, Tokyo (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 15/021,591

(22) PCT Filed: Aug. 7, 2014

(86) PCT No.: PCT/JP2014/070938
§ 371 (c)(1),
(2) Date: Mar. 11, 2016

(87) PCT Pub. No.: WO2015/059980
PCT Pub. Date: Apr. 30, 2015

(65) Prior Publication Data
US 2016/0242098 A1   Aug. 18, 2016

(30) Foreign Application Priority Data

Oct. 24, 2013 (JP) .................................. 2013-221452

(51) Int. Cl.
*H04W 52/24* (2009.01)
*H04W 40/12* (2009.01)
(Continued)

(52) U.S. Cl.
CPC ........... *H04W 40/12* (2013.01); *H04W 24/08* (2013.01); *H04W 28/18* (2013.01); *H04W 40/20* (2013.01)

(58) Field of Classification Search
CPC ..... H04L 25/03343; H04L 2025/03802; H04L 2025/0377; H04L 5/006; H04L 1/0026;
(Continued)

(56) References Cited

U.S. PATENT DOCUMENTS

| 8,447,255 B2 | 5/2013 | Asokan |
| 2002/0114301 A1* | 8/2002 | Yee ..................... H04B 7/2603 370/338 |

(Continued)

FOREIGN PATENT DOCUMENTS

| DE | 10 2009 007 951 A1 | 8/2010 |
| JP | 2007-221357 A | 8/2007 |

(Continued)

OTHER PUBLICATIONS

International Search Report Issued Nov. 18, 2014 in PCT/JP14/70938 Filed Aug. 7, 2014.

(Continued)

*Primary Examiner* — Quan M Hua
(74) *Attorney, Agent, or Firm* — Oblon, McClelland, Maier & Neustadt, L.L.P.

(57) ABSTRACT

A mobile station that communicates with a base station includes, a distance calculation unit that calculates the distance between the mobile station and the base station, a reception power measurement unit that measures a reception power of a reception signal received from the base station; a rain state determination unit that determines a transmission-path quality on the basis of a reception-power theoretical value corresponding to the distance and a reception power measured by the reception power measurement unit and selects a communication parameter on the basis of the determined transmission-path quality, and a modulation unit that generates a transmission signal to be transmitted to the base station by using a communication parameter.

15 Claims, 3 Drawing Sheets

(51) Int. Cl.
*H04W 28/18* (2009.01)
*H04W 24/08* (2009.01)
*H04W 40/20* (2009.01)

(58) Field of Classification Search
CPC ... H04L 1/20; H04L 25/03949; H04L 25/067; H04L 1/0072; H04W 52/367; H04W 52/346; H04W 88/12; H04W 52/242; H04W 52/262; H04W 52/265; H04W 52/48; H04W 80/00; H04B 17/24; H04B 17/318; H04B 7/0632
See application file for complete search history.

(56) References Cited

U.S. PATENT DOCUMENTS

| | | | | |
|---|---|---|---|---|
| 2006/0244615 | A1* | 11/2006 | Koors | G01P 5/04 340/601 |
| 2007/0191041 | A1* | 8/2007 | Chapin | H04W 52/346 455/509 |
| 2010/0105425 | A1 | 4/2010 | Asokan | |
| 2010/0136915 | A1* | 6/2010 | Fukumura | H04L 1/0003 455/63.1 |
| 2011/0244803 | A1 | 10/2011 | Ichikawa | |
| 2012/0127947 | A1 | 5/2012 | Usui | |

FOREIGN PATENT DOCUMENTS

| | | |
|---|---|---|
| JP | 2007-251883 | 9/2007 |
| JP | 2008-17252 | 1/2008 |
| JP | 2011-142517 A | 7/2011 |
| JP | 2012-507190 | 3/2012 |
| JP | 5195920 B2 | 5/2013 |
| WO | 2011/045828 A1 | 4/2011 |

OTHER PUBLICATIONS

Office Action dated Nov. 22, 2016 in Japanese Patent Application No. 2015-543738 (with English Translation).
Extended European Search Report dated May 26, 2017 in Patent Application No. 14854957.9.

* cited by examiner

MOBILE STATION, BASE STATION, WIRELESS COMMUNICATION SYSTEM, AND COMMUNICATION METHOD

FIELD

The present invention relates to a mobile station, a base station, a wireless communication system, and a communication method.

BACKGROUND

In wireless communication systems, the characteristics of a transmission path change. Factors involved in a change of the characteristics of a transmission path include movement of a mobile stations and the effect of rain. In particular, radio waves in high frequency bands, such as microwaves and millimeter waves, are increasingly attenuated due to rain. Hence, outdoor wireless communication using radio waves in a high frequency band poses a difficulty in maintaining the communication distance in rain.

To address this problem, Patent Literature 1 discloses a wireless communication system that changes modulation systems according to the reception power. Specifically, a measured reception power is compared to the reception power necessary for the modulation system currently in use (required reception power), and, if the measured reception power is larger than the required reception power by a value not less than a predetermined value, the modulation system is changed to a system having a larger modulation multi-level number than that of the modulation system currently in use. If the measured reception power is smaller than the required reception power by a value not less than a predetermined value, the modulation system is changed to a system having a smaller modulation multi-level number than that of the modulation system currently in use. A modulation system having a smaller modulation multi-level number typically requires a smaller reception power. Thus, when the reception power is reduced due to rain, the modulation system is switched to a system requiring a smaller reception power, that is, having a smaller modulation multi-level number, so as to increase the communication distance in the rain.

CITATION LIST

Patent Literature

Patent Literature 1: Japanese Patent No. 5195920

SUMMARY

Technical Problem

Patent Literature 1, however, assumes a wireless communication system made up of fixed stations. Applying the method described in Patent Literature 1 to a wireless communication system including a mobile station causes problems as below. When the reception power falls due to fading fluctuations caused by the movement of a mobile station, the modulation system is changed to a system having a smaller modulation multi-level number. If the time during which the reception power is low due to the fading is shorter than the control time (a control delay) during which the modulation system is changed, the modulation system is changed to a system having a smaller modulation multi-level number even though there is no reduction in reception power due to the fading (the period in which the reception power is low has ended), and this may lead to a reduction in transmission speed.

The present invention has been achieved in view of the above, and an object of the present invention is to provide a mobile station, a base station, a wireless communication system, and a communication method that can maintain a communication distance even when the state of a transmission path is degraded.

Solution to Problem

In order to solve the aforementioned problems, a mobile station that communicates with a base station according to one aspect of the present invention is so constructed as to include a distance calculation unit that calculates a distance between the mobile station and the base station itself, a reception power measurement unit that measures a reception power of a reception signal received from the base station, a transmission-path state determination unit that determines a transmission-path quality on a basis of a reception-power theoretical value corresponding to the distance and a reception power measured by the reception power measurement unit and selects a communication parameter on the basis of the determined transmission-path quality, and a transmission processing unit that generates a transmission signal to be transmitted to the base station by using a communication parameter selected by the transmission-path state determination unit.

Advantageous Effects of Invention

A mobile station, a base station, a wireless communication system, and a communication method according to the present invention produce effects of being capable of maintaining a communication distance even when the state of a transmission path is degraded, while inhibiting reduction in transmission speed.

DESCRIPTION OF EMBODIMENTS

Exemplary embodiments of a mobile station, a base station, a wireless communication system, and a communication method according to the present invention will now be described in detail with reference to the drawings. The present invention is not limited to the embodiments.

First Embodiment

Figure 1:
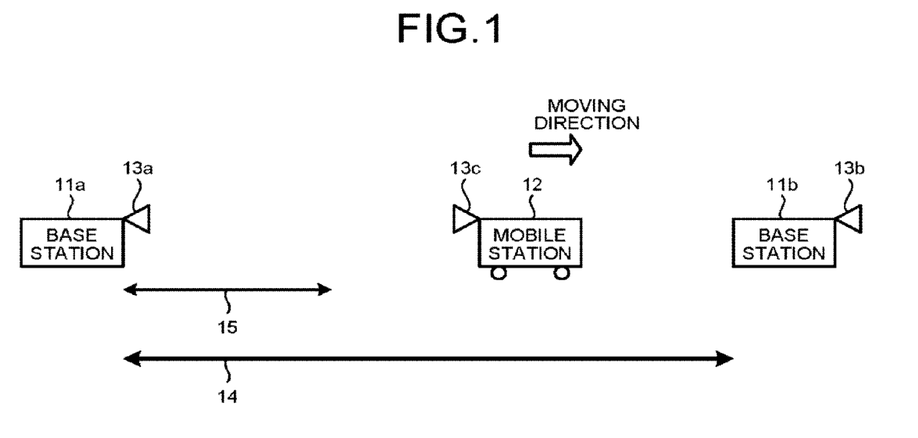
FIG. 1 is a diagram illustrating an example configuration of a wireless communication system according to a first embodiment of the present invention.

FIG. 1 is a diagram illustrating an example configuration of a wireless communication system according to a first embodiment of the present invention. As illustrated in FIG. 1, the wireless communication system according to the present embodiment includes a base station 11a, which includes a directional antenna 13a, a base station 11b, which includes a directional antenna 13b, and a mobile station 12, which includes a directional antenna 13c. The numbers of base stations and mobile stations are not limited to those in the example in FIG. 1. The mobile station 12 is, for example, mounted in a vehicle, such as an automobile or a train, but means for moving the mobile station 12 is not limited to a vehicle.

A clear-weather communication area 14 in FIG. 1 indicates an area in which communication with the base station 11a is possible in a clear weather when a communication parameter that can achieve the maximum transmission speed specified in the wireless communication system according to the present embodiment is set. To simplify the explanation, it is assumed that the clear-weather communication area 14 is equal to the distance between the base station 11a and the base station 11b, although the clear-weather communication area 14 may be unequal to the distance between the base station 11a and the base station 11b. A maximum rainy-weather communication area 15 indicates an area in which the communication with the base station 11a is possible in rainy weather with the maximum quantity of rain permissible by the wireless communication system according to the present embodiment when a communication parameter that can achieve the maximum transmission speed explained above is set. Since radio waves attenuate due to rain, the maximum rainy-weather communication area 15 is smaller than the clear-weather communication area 14. The permissible maximum quantity of rain in the wireless communication system according to the present embodiment refers to the maximum quantity of rain assumed as an environment in which a mobile station and a base station communicate with each other. Like the base station 11a, the base station 11b has a maximum rainy-weather communication area 15 and a clear-weather communication area 14, which are not illustrated in FIG. 1.

It is assumed that the mobile station 12 is moving between the base station 11a and the base station 11b in a direction toward the base station 11b. The directional antenna 13c included in the mobile station 12 is oriented in a direction toward the base station 11a. The directional antenna 13a included in the base station 11a and the directional antenna 13b included in the base station 11b are oriented in the moving direction of the mobile station 12; that is, the directional antenna 13a is installed in the direction of the base station 11b, and the directional antenna 13b is installed in the direction opposite to the base station 11a. Thus, when the mobile station 12 is present between the base station 11a and the base station 11b, the mobile station 12 transmits/receives a radio signal to/from the base station 11a, and when the mobile station 12 has passed the base station 11b, the mobile station 12 transmits/receives a radio signal to/from the base station 11b. In other words, the mobile station 12 communicates with the base station 11a in a period in which it is present between the base station 11a and the base station 11b, and the mobile station 12 communicates with the base station 11b when it moves into the communication area of the base station 11b. The handover from the base station 11a to the base station 11b may be performed by any method. The mobile station 12 can travel on the same travel path between the base station 11a and the base station 11b more than once.

In the example described here, although the orientations of the directional antennas 13a, 13b, and 13c are fixed as illustrated in FIG. 1, the orientations may be unfixed, and the directional antennas may be configured such that the orientations can be changed depending on the moving direction.

Figure 2:
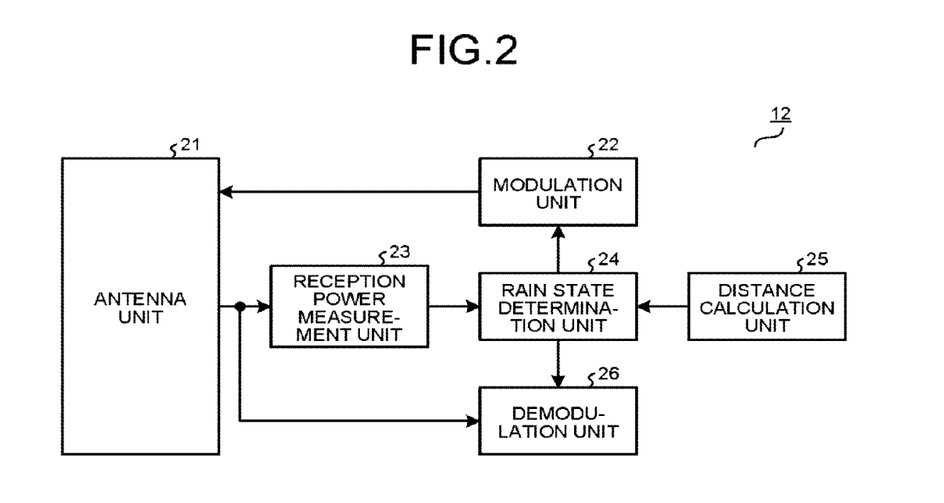
FIG. 2 is a diagram illustrating an exemplary configuration of a mobile station according to a first embodiment.

FIG. 2 is a diagram illustrating an exemplary configuration of the mobile station 12 according to the present embodiment. As illustrated in FIG. 2, the mobile station 12 includes an antenna unit 21, a modulation unit (transmission processing unit), a reception power measurement unit 23, a rain state determination unit 24 (transmission-path state determination unit), a distance calculation unit 25, and a demodulation unit 26 (reception processing unit). The configurations of the base station 11a and the base station 11b are equivalent to that of the mobile station 12. The antenna unit 21 corresponds to the directional antenna 13c in the mobile station 12, to the directional antenna 13a in the base station 11a, and to the directional antenna 13b in the base station 11b.

The mobile station 12 transmits/receives a radio signal to/from a base station that is an opposing device thereof (the base station 11a or the base station 11b) by the antenna unit 21. The reception power measurement unit 23 measures the reception power of a reception signal received by the antenna unit 21. The distance calculation unit 25 calculates the distance between the mobile station 12 and the base station that is the opposing device according to the present position of the mobile station 12 and the position of the base station. The present position of the mobile station 12 may be acquired with a GPS (Global Positioning System) receiver (not shown) provided therein, or if the mobile station 12 is installed in a vehicle, it may be calculated according to the number of rotations of a wheel of the vehicle. If the vehicle in which the mobile station 12 is installed is a train, the present position of the mobile station 12 may be acquired from a ground unit installed on a railway track. Alternatively, it can be arranged such that the mobile station 12 acquires the present position of the base station by communicating with the base station that is the opposing device, or communicating with other devices, or the present position may be set in the mobile station 12 in advance. The distance between the base station and the mobile station 12 may be calculated by using radio distance measuring. Since it is assumed here that the mobile station 12 travels on a predetermined travel path, the position of the base station may be detected by the distance from a reference position on the travel path. The rain state determination unit 24 determines a rain state on the basis of a theoretical value corresponding to the reception power measured by the reception power measurement unit 23 and the distance between the mobile station 12 and the base station calculated by the distance calculation unit 25 and determines a communication parameter according to the determination result. Examples of communication parameters include a modulation system, an encoding rate, a signal bandwidth, and a transmission power. The modulation unit 22 modulates information to be transmitted using the communication parameter determined by the rain state determination unit 24, that is, it generates a transmission signal using the communication parameter, and outputs the transmission signal (modulation signal) to the antenna unit 21. The modulation unit 22 may perform encoding processing, such as error correction encoding.

The demodulation unit 26 of the mobile station 12 demodulates a signal received from the base station. When a reception signal is encoded, the demodulation unit 26 also performs decoding.

Note that, like the mobile station 12, the base station that is the opposing device determines the rain state as described hereinafter. Although the mobile station 12 and the base station that is the opposing device determine the rain state individually, their determination results are highly likely to coincide with each other. Hence, the rain state determination unit 24 sets the determined communication parameter also in the demodulation unit 26, and the communication parameter similar to that of the modulation unit 22 is used for the demodulation of a reception signal received from the base station that is the opposing device.

Alternatively, it can be arranged such that the transmission processing (modulation or the like) is performed using the communication parameter determined by the mobile station 12 itself, while reception processing (demodulation or the like) is performed using a communication parameter notified by the base station that is the opposing device. In this case, the modulation unit 22 transmits a communication parameter determined by the rain state determination unit 24 to the base station that is the opposing device via the antenna unit 21. Note that when the determined communication parameter is transmitted, a predetermined communication parameter such as a fixed modulation system is used, regardless of the rain state. Alternatively, the determination result of the rain state may be transmitted to the opposing device in place of a communication parameter. The base station that is the opposing device also transmits a determined communication parameter to the mobile station 12. Of the reception signal including the communication parameter, the demodulation unit 26 of the mobile station 12 first demodulates the communication parameter with a predetermined demodulation system and then demodulates the reception signal other than the communication parameter using the received communication parameter. In the case where a determination result of the rain state is received from the opposing device instead of a communication parameter, a communication parameter corresponding to the determination result of the rain state is selected and set.

Like the mobile station 12, the base station that is the opposing device determines a rain state and determines a communication parameter. The base station then performs modulation using the determined communication parameter and transmits a modulation signal. In the base station, its distance calculation unit 25 uses the present position of the mobile station 12 and the present position of the base station itself to calculate the distance between the mobile station 12 and the base station. However, the present position of the mobile station 12 may be acquired from the mobile station 12. That is, the mobile station 12 may transmit the present position as a radio signal, and the base station may receive the radio signal to acquire the present position. Alternatively, the base station may be notified of the present position of the mobile station 12 by an undepicted control station that controls a plurality of base stations. The present position of the base station may be set in the base station in advance, or the base station may be notified of it by a control station that controls a plurality of base stations. As described above, a modulation unit 22 of the base station may transmit a communication parameter determined by its rain state determination unit 24 to the mobile station 12.

The demodulation unit 26 of the base station demodulates a reception signal received via its antenna unit 21 from the mobile station 12 using the communication parameter determined by the rain state determination unit 24. As described above, the demodulation may be performed using a communication parameter notified by its opposing device.

Figure 3:
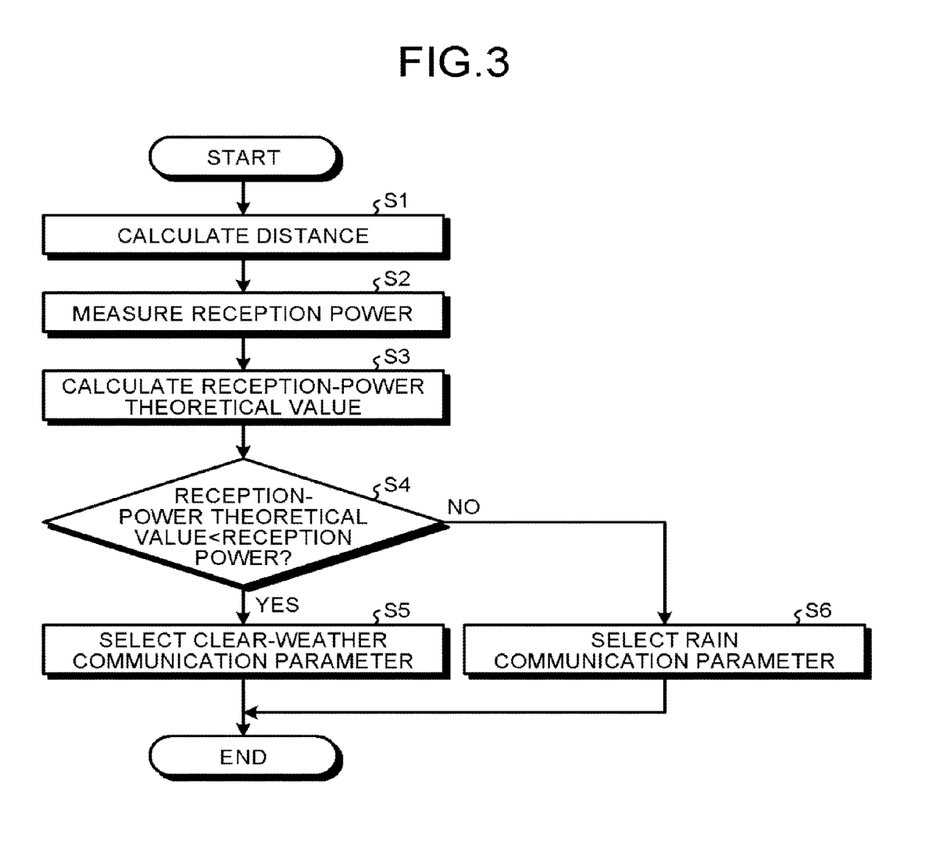
FIG. 3 is a flowchart illustrating an exemplary procedure to determine a communication parameter in the first embodiment.

A method of determining a communication parameter on the basis of a rain state (parameter selection processing) according to the present embodiment will now be described. FIG. 3 is a flowchart illustrating an exemplary procedure of the rain state determination unit 24 to determine a communication parameter. While the mobile station 12 and the base stations 11a and 11b use different procedures to acquire information (the position of the mobile station 12 and the position of the base station) for calculating the distance between the devices, they use similar procedures otherwise. The rain state determination unit 24 retains in advance a clear-weather communication parameter (first parameter), which is a communication parameter to be used in clear weather, and a rainy-weather communication parameter (second parameter), which is a communication parameter to be used in rainy weather (when the quality of a transmission path is poorer than that in clear weather). It is assumed here that the clear-weather communication parameter is a communication parameter that specifies a modulation system, an encoding rate, and the like for achieving the maximum transmission speed. It is assumed here that the rainy-weather communication parameter is a parameter that achieves a lower transmission speed than the clear-weather communication parameter and a longer distance over which communication is possible than the clear-weather communication parameter. As an example, the rainy-weather communication parameter is a communication parameter that satisfies, in comparison with the clear-weather communication parameter, one or more of conditions that the modulation system has a smaller modulation multi-level number, the encoding rate is smaller, the transmission power is larger, and the signal bandwidth is smaller. It is assumed here that the clear-weather communication parameter is a communication parameter for achieving the maximum transmission speed, but the clear-weather communication parameter is not limited thereto and may be any communication parameter as long as the communication using the clear-weather communication parameter achieves a higher transmission speed than the communication using the rainy-weather communication parameter.

The distance calculation unit 25 calculates the distance between the own device in which the calculation unit itself is included and an opposing device with which the own device communicates (a device-to-device distance) (step S1). In the case of the mobile station 12, the distance between its own position and a base station it opposes (which is, for example, the base station 11a if it is present between the base station 11a and the base station 11b as illustrated in FIG. 1) is calculated. In the case of the base station, the distance between its position and the mobile station 12 it opposes is calculated.

The reception power measurement unit 23 measures the reception power of a reception signal received from the opposing device (step S2). The rain state determination unit 24 obtains a reception-power theoretical value on the basis of the device-to-device distance calculated by the distance calculation unit 25 (step S3). Here, it is assumed that the rain state determination unit 24 obtains the reception-power theoretical value corresponding to the device-to-device distance by referring to a theoretical-value table contained in advance. The theoretical-value table is a table that associates a device-to-device distance and a reception-power theoretical value. For example, a theoretical-value table may be created by calculating in advance a free-space propagation loss for each device-to-device distance, or alternatively, a theoretical-value table may be created by using a history of reception powers existing when the mobile station 12 that is the opposing device or another mobile station has traveled on the same travel path in the past. That is, theoretical values may be calculated on the basis of the association between the measurement values of the distances from the base station taken during the traveling in the past on the identical travel path and the reception powers. The values in the reception power theoretical-value table may be updated on the basis of the present reception power measured by the reception power measurement unit 23. The reception power theoretical-value table may include a margin added to theoretical values obtained by calculation or by using a history. Note that it is assumed here that the theoretical values are obtained by using a table, but reception-power theoretical values may be calculated by performing an operation according to an arithmetic expression, instead of using a table.

The rain state determination unit 24 determines whether or not a measured reception power Pr is larger than a reception-power theoretical value Pt (step S4). If the measured reception power Pr is larger than the reception-power theoretical value Pt (step S4, Yes), the rain state determination unit 24 determines that there is no rain and selects the clear-weather communication parameter as the communication parameter (step S5) and finishes the parameter selection processing. If the measured reception power Pr is equal to or smaller than the reception-power theoretical value Pt (step S4, No), the rain state determination unit 24 determines that there is rainfall and selects the rainy-weather communication parameter as the communication parameter (step S6) and finishes the parameter selection processing. The rain state determination unit 24 notifies the modulation unit 22 of the selected communication parameter.

Note that the processing in steps S1, S2, and S3 may be performed at a frequency different from that of the processing in step S4 and thereafter explained above. For example, the processing in steps S1, S2, and S3 may be performed at a higher frequency than the processing in step S4 and thereafter, and, in the determination in step S4, the comparison may be made in more than one pair of Pr and Pt to decide the presence of rain by majority according to the comparison results.

Alternatively, in a state that a comparison performed once between Pr and Pt results in different present positions of the mobile station 12, if the comparison results in Pr>Pt for N times (where N is a positive integer) in succession, it may be determined that there is no rainfall, and if results in Pr<Pt for N times in succession, it may be determined that there is rainfall.

By using a communication parameter that achieves a longer transmission distance in exchange for a lower transmission speed only in rainy weather in which the quality of a transmission path is poorer than that in clear weather in the manner described above, the communication area in rainy weather is enabled to be maintained, while a reduction in transmission speed is enabled to be inhibited in clear weather. Additionally, by configuring such that a reception power measured at one location is compared with a theoretical value corresponding to a device-to-device distance at the same location, the need for averaging reception powers can be avoided and the determination of rainfall (hereinafter may be referred to just as "rain determination) independent of the moving speed is enabled.

The parameter selection processing described above may be performed, for example, regularly at fixed time intervals, or alternatively, a section in which the parameter selection processing is performed and a section in which it is not performed may be predetermined in accordance with the positions of the mobile station 12 and the base station. For example, since the maximum rainy-weather communication area 15 in FIG. 1 is an area in which communication is possible at the maximum transmission speed even in the maximum rainfall period, the communication can be performed using a communication parameter that corresponds to the maximum transmission speed even in rainy weather. Hence, while the mobile station 12 is present in the maximum rainy-weather communication area 15, the rain state determination unit 24 may perform no parameter selection processing described above and select the clear-weather communication parameter, and, when the mobile station 12 is outside the maximum rainy-weather communication area 15, the rain state determination unit 24 may perform the parameter selection processing on the basis of the rain state. Note that it is assumed that an undepicted control station has notified the base station of the maximum rainy-weather communication area 15 in advance or sets that the maximum rainy-weather communication area 15 in the base station and the mobile station 12. In this case, if selection of a communication parameter to be used outside the maximum rainy-weather communication area 15 is performed in advance in the maximum rainy-weather communication area 15, and setting the selected parameter (setting it in the modulation unit 22) is performed at the timing of getting from the inside of the maximum rainy-weather communication area 15 to the outside of the maximum rainy-weather communication area 15, that is, at the end of the maximum rainy-weather communication area 15, then, a speedy changeover corresponding to the weather is enabled. Note that, if the clear-weather communication parameter is selected during the time in which the parameter selection is to be performed in the maximum rainy-weather communication area 15, practically communication parameters do not have to be switched. The parameter selection processing may be performed by the mobile station 12 at any one point in the maximum rainy-weather communication area 15. Alternatively, the mobile station 12 may determine the presence of rainfall based on the majority decision by using the measurement results and theoretical values of reception powers taken while passing through the maximum rainy-weather communication area 15, and select a communication parameter to be used outside the maximum rainy-weather communication area 15 according to the determination result.

By configuring such that the rain determination is performed when a mobile station is present in a specific area in the manner described above, reduction in size of the reception power theoretical-value table is enabled. In particular, by configuring the mobile station 12 such that it performs the parameter selection processing once in the maximum rainy-weather communication area 15 and then keeps using the same communication parameter while the mobile station 12 is communicating with the same base station, the device-to-device distance to be considered is limited and thereby reduction in size of the theoretical-value table is enabled. Additionally, by specifying a parameter changeover position according to the distance between the base station and the mobile station 12, a parameter changeover without the effects of fading is made possible. The example described here assumes that the specific area in which the rain determination is performed is the maximum rainy-weather communication area 15, but the specific area in which the rain determination is performed is not limited to the maximum rainy-weather communication area 15. For example, the specific area in which the rain determination is performed may be set to an area that is only a part of the maximum rainy-weather communication area 15 (near the border of the maximum rainy-weather communication area 15), or set to be a predetermined section stretching from the inside to the outside of the maximum rainy-weather communication area 15.

In the case in which the mobile station 12 performs the parameter selection processing described above only in the maximum rainy-weather communication area 15, if the mobile station 12 performs the parameter selection processing once and then comes to a halt for reasons such as an emergency stop outside the maximum rainy-weather communication area 15, the parameter selection processing may be performed again. Whether or not the mobile station 12 has come to a halt may be determined with any method; for example, if the distance between the mobile station and the base station calculated by the distance calculation unit 25 is of the same value for a predetermined time period or longer, it can be determined that the mobile station 12 has come to a halt.

By configuring such that the mobile station 12 can perform the rain determination while it is stopped and change communication parameters, the use of an optimal communication parameter is enabled even when the weather changes after the mobile station is stopped for reasons such as an emergency.

The rain state determination unit 24 may estimate the quantity of rain in addition to determining the presence of rainfall and use three or more communication parameters corresponding to the quantity of rain. As an example, with threshold values having a relationship of $A>B$ provided, it is determined that, if $Pr>Pt$, there is no rain; if $A<Pr\leq Pt$, there is light rain; if $B<Pr\leq A<Pt$, there is medium rain; and if $B\geq Pr$, there is heavy rain. Four communication parameters corresponding to no rain, light rain, medium rain, and heavy rain are retained as parameters for achieving a longer communication distance for a larger quantity of rain, but with a lower transmission speed, and out of these parameters, a communication parameter is determined in accordance with the quantity of rain.

The parameter changeover position at which the communication parameter is switched from the clear-weather communication parameter to the rainy-weather communication parameter may be changed according to the quantity of rain. For example, because of a longer communication distance for a smaller quantity of rain, if the determination result of the rainfall described above determines that there is rainfall during the communication using the clear-weather communication parameter, the position at which the parameter is switched to the rainy-weather communication parameter can be shifted toward the base station 11*b* in the case of a smaller quantity of rain in comparison with a larger quantity of rain. For example, assuming that if the quantity of rain estimated by the estimation described above is heavy rain, the switchover position to the rainy-weather communication parameter is set as a first position, then, in the case where the estimated quantity of rain is medium rain, a second position, which is toward the base station 11*b* beyond the first position, is set as the switchover position.

Communication parameters may be changed in stages depending on the quantity of rain. For example, when it is determined that there is heavy rain, the clear-weather communication parameter may be used while the mobile station 12 is in the maximum rainy-weather communication area 15, and then, the parameter to be used may be changed in stages to a light rain communication parameter, to a medium rain communication parameter, and to a heavy rain communication parameter.

By using a communication parameter corresponding to the quantity of rain in the manner described above, both the communication area and the transmission speed can be maintained simultaneously. When the mobile station 12 is in a tunnel, the rain state determination unit 24 may select the clear-weather communication parameter at all times. To obtain information on whether or not the mobile station 12 is in a tunnel, the mobile station 12 may acquire information indicative of a section inside the tunnel from the base station or the like; alternatively, the information may be set in advance in the mobile station 12. By configuring such that the clear-weather communication parameter is used at all times when the mobile station is in a tunnel where there is no rainfall, the risk of erroneously determining as a rain state in a tunnel can be eliminated. Due to this, communication with the maximum transmission speed in a tunnel is enabled at all times.

In the examples described above, a case in which the quality degradation of a transmission path is caused by rainfall is explained. The application of the method for selecting a parameter according to the present embodiment is not limited to the presence of rain, but the method may be also applied to other weather conditions, such as snow, and quality degradation of a transmission path due to factors other than weather conditions, such as an obstacle. In other words, in step S4, it can be determined as to whether or not a transmission path is degraded, in addition to rainfall, in comparison with an ideal state by comparing a measured reception power and a theoretical value. Therefore, for example, it is assumed that a communication parameter for achieving the maximum transmission speed is set to be a first parameter, and a communication parameter for achieving a lower transmission speed in exchange for a longer distance, over which communication is made possible than that of the case in which the first parameter is set, is set to be a second parameter. In this state, if $Pr>Pt$, it is determined that a transmission path is not degraded, and the first parameter is selected, and if $Pr\leq Pt$, it is determined that the transmission path is degraded, and the second parameter is selected. Further, it can be arranged for example, that with threshold values having a relationship of $A>B$ being provided, if $Pr>Pt$, it is determined that there is no degradation and the first parameter is selected, if $A<Pr\leq Pt$, it is determined that the degradation is small and the second parameter is selected; if $B<Pr\leq A<Pt$, it is determined that the degradation is medium and a third parameter is selected, and if $B\geq Pr$, it is determined that the degradation is large and a fourth parameter is selected. In such a manner, degradation may be determined in three or more stages. The first to fourth parameters are set such that they achieve a longer distance over which the communication is possible for a larger degradation of a transmission path.

As described above, the present embodiment determines a degradation state of a transmission path on the basis of a comparison result between a measurement value of a reception power and a theoretical value of the reception power calculated on the basis of the distance between the opposing devices and selects a communication parameter on the basis of the determination result. Thus, even when the device-to-device distance changes and even when the quality of a transmission path is degraded, the present embodiment can suppress a reduction in transmission speed and maintain the communication distance.

In the examples described above, both the base station and the mobile station include a directional antenna, but one or more of the base station and the mobile station may include a nondirectional antenna.

Second Embodiment

Figure 4:
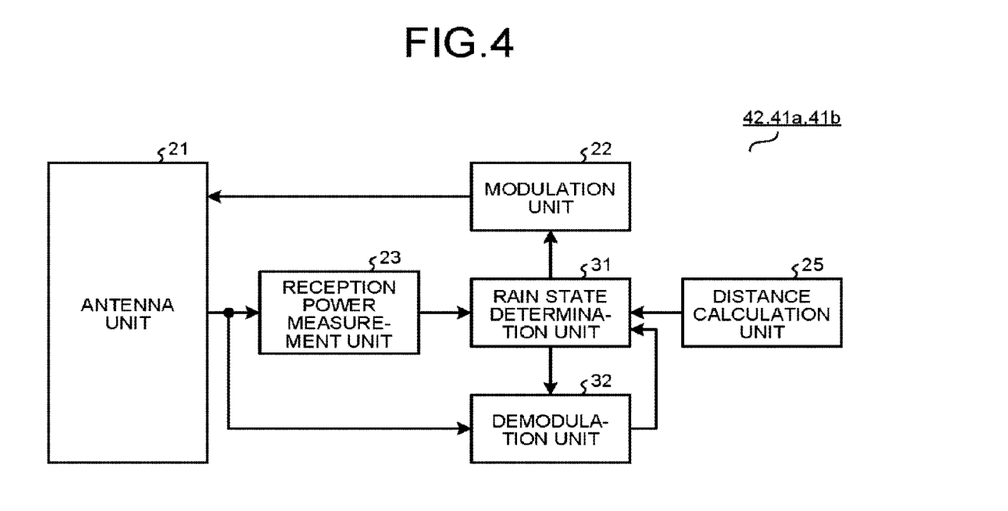
FIG. 4 is a diagram illustrating an exemplary configuration of a mobile station according to a second embodiment.

FIG. 4 is a diagram illustrating an exemplary configuration of a mobile station 42 according to a second embodiment of the present invention. The configuration of a wireless communication system according to the present embodiment is similar to that of the wireless communication system in FIG. 1 except that the mobile station 12 and the base stations 11a and 11b are replaced by a mobile station 42 and base stations 41a and 41b, respectively. The configurations of the base stations 41a and 41b are similar to that of the mobile station 42. Portions different from the first embodiment are described below.

As illustrated in FIG. 4, the mobile station 42 according to the present embodiment corresponds to the mobile station 12 according to the first embodiment, with the rain state determination unit 24 and the demodulation unit 26 being replaced with a rain state determination unit 31 and a demodulation unit 32, respectively. The components having similar functions to those in the first embodiment are designated by the identical symbols with those in the first embodiment, and the description thereof is omitted.

In the first embodiment, the method is described in which the mobile station and the base station each determine a parameter for use independently on the basis of their respective rain determination results. In the present embodiment, a method will be described in which a parameter to be used is determined according to the rain determination results of both the mobile station 42 and a base station (the base station 41a or the base station 41b).

The demodulation unit 32 demodulates a reception signal received by the antenna unit 21 and outputs a rain state determination result determined by a base station that is the opposing device or information indicative of a communication parameter being used by the base station that is the opposing device, both of which are included in the demodulation data, to the rain state determination unit 31. The rain state determination result and the information indicative of a communication parameter are pieces of information that indicate a result of determination of the rain state (the quality of a transmission path) performed by the base station. In the example described here, although the base station notifies of a rain state determination result or a communication parameter, the base station may transmit a signal indicative of a change when it changes the rain state determination result or the communication parameter.

Like the rain state determination unit 24 in the first embodiment, the rain state determination unit 31 determines the rain state on the basis of a reception power measured by the reception power measurement unit 23 and the distance between the mobile station and the base station calculated by the distance calculation unit 25. Furthermore, the rain state determination unit 31 compares the rain state determination result determined by the base station that is the opposing device, which is input from the demodulation unit 32, with the rain state that the mobile station itself has determined and selects one with the larger quantity of rain as the present quantity of rain. The rain state determination unit 31 then selects and sets a communication parameter corresponding to the selected quantity of rain as the communication parameter to be used by the modulation unit 22 and the demodulation unit 32.

In the case where the information indicative of a communication parameter being used by the base station that is the opposing device is received from the opposing device in place of the rain state determination result, the rain state determination unit 31 compares the information on the communication parameter being used by the opposing device and input from the demodulation unit 32 with the communication parameter corresponding to the rain state that the mobile station itself has determined. Then, the rain state determination unit 31 selects and sets the communication parameter that achieves the longer communication distance as the communication parameter to be used by the modulation unit 22 and the demodulation unit 32.

In the base stations 41a and 41b, a rain state determination unit 31 also compares the rain state determination result determined by the mobile station 42 that is their opposing device, which is input from a demodulation unit 32, with the rain state of the base stations each determined by itself, and selects one with the larger quantity of rain as the present quantity of rain, in a manner similar to that of the mobile station 42. The rain state determination unit 31 then selects and sets the communication parameter corresponding to the selected quantity of rain as the communication parameter to be used by the modulation unit 22 and the demodulation unit 32.

By selecting a determination result with a larger quantity of rain, in other words, by selecting a communication parameter that achieves a longer communication distance, when the mobile station 42 and the base station produce different rain state determination results in the manner described above, the communication distance can be maintained even if the mobile station 42 or the base station has erroneously determined the rain state.

Additionally, the mobile station 42 may perform the parameter selection processing on the basis of the rain state, limiting to a section that is inside the maximum rainy-weather communication area 15, as described in the first embodiment. In such a case, if the rain determination result (or the information indicative of a communication parameter) notified by the opposing device (a base station) is changed after the mobile station 42 has determined a communication parameter once and then further moves over a predetermined distance or longer, a communication parameter to be used by the mobile station 42 may be selected again in the manner described above on the basis of the rain determination result (or the information indicative of the communication parameter being used by the base station) notified by the opposing device and the rain state determined by the mobile station 42. That is, for example, if the rain determination result notified by the opposing device (the base station) indicates that there is rainfall after the mobile station 42 has determined that there is no rain and then further moved over a predetermined distance or longer, the communication parameter is changed to a communication parameter corresponding to the rain determination result received from the opposing device (the base station).

By arranging such that a communication parameter of the mobile station 42 can be changed in accordance with the communication parameter being used by the base station while the mobile station 42 is moving outside the maximum rainy-weather communication area 15 in the manner described above, a determination result of the rain state used by the base station for the parameter selection processing performed with another undepicted mobile station is enabled to be reflected in the mobile station 42 while it is moving outside the maximum rainy-weather communication area 15. In other words, it is assumed that there is another undepicted mobile station in the maximum rainy-weather communication area 15 and that the base station performs, with this other mobile station, the parameter selection processing on the basis of the rain state to find that the rain state has changed from one at the point in time of the parameter selection processing performed with the mobile station 42. In such a case, by notifying the mobile station 42 of the determination result of the rain state used by the base station in the parameter selection processing performed with the other mobile station, a change in the rain state can be also reflected in the mobile station 42. The operations in the present embodiment other than those described above are similar to those in the first embodiment.

As described above, in the present embodiment, the rain state determination unit 31 compares the rain state determination result determined by a base station that is the opposing device, which is input from the demodulation unit 32, with the rain state the mobile station itself has determined, and selects the larger quantity of rain as the present quantity of rain. Thus, the present embodiment can produce similar effects to those of the first embodiment and can maintain the communication distance reliably even when the rain state is determined erroneously.

Third Embodiment

Figure 5:
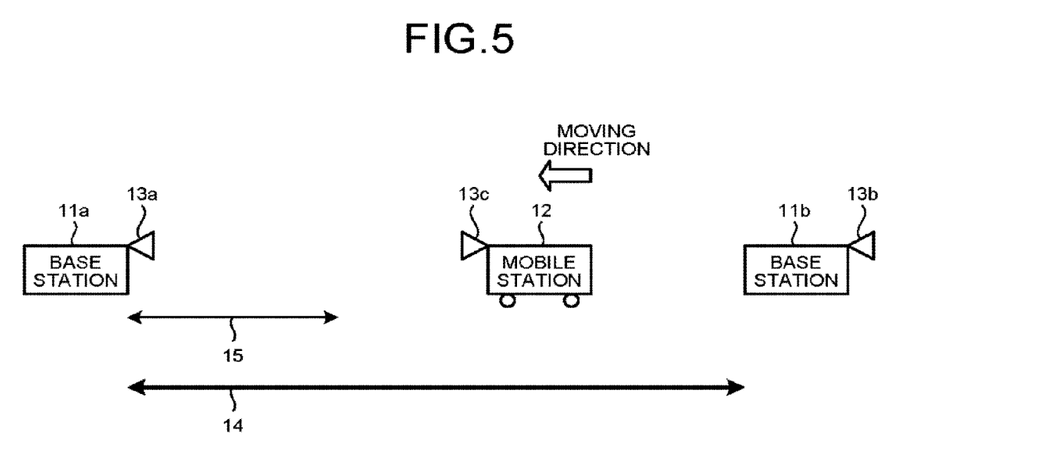
FIG. 5 is a diagram illustrating an example configuration of a wireless communication system according to a third embodiment.

FIG. 5 is a diagram illustrating an example configuration of a wireless communication system according to a third embodiment of the present invention. As illustrated in FIG. 5, the wireless communication system according to the present embodiment is similar to the wireless communication system of the first embodiment, except that the orientation of the directional antenna 13c of the mobile station 12 is different in that it is set in the same direction as the moving direction. The configurations of the mobile station 12 and the base stations 11a and 11b are similar to those of the first embodiment. Portions different from the first embodiment are described below. The present embodiment is described here using the configuration of the mobile station 12 of the first embodiment as an example, but the operation of the present embodiment may also be applied in the similar manner to the mobile station 42 of the second embodiment if the orientation of its directional antenna 13c is set in the same direction as that of the moving direction.

In the first and second embodiments, the wireless communication systems are described in which the directional antenna included in the mobile station (the mobile station 12 or the mobile station 42) is installed in the direction opposite to the moving direction, but in the present embodiment, the directional antenna included in the mobile station is installed in the same direction as the moving direction.

As illustrated in FIG. 5, the mobile station 12 in the wireless communication system moves between the base station 11a and the base station 11b in a direction toward the base station 11a. In the first embodiment, the area in which the mobile station 12 is present after the handover is the maximum rainy-weather communication area 15 of a base station to which the mobile station 12 is handed over, whereas, in the present embodiment, the area in which the mobile station 12 is present after the handover will be outside the maximum rainy-weather communication area 15 of the base station to which the mobile station 12 is handed over.

In the present embodiment, if the period in which the parameter selection processing is performed is limited to the period in which the mobile station 12 is present in the maximum rainy-weather communication area 15, the selected communication parameter is executed at a timing after the handover. That is, for example, the operations as below are performed. It is assumed that the mobile station 12 performs the parameter selection processing described in the first embodiment or the second embodiment while communicating with the base station 11b in the undepicted maximum rainy-weather communication area 15 of the base station 11b (an area that is on the side starting from the base station 11b in FIG. 5 opposite to the moving direction of the mobile station 12). The mobile station 12 sets the selected communication parameter in the modulation unit 22 and the demodulation unit 26 after the handover from the base station 11b to the base station 11a and notifies the base station 11a of the communication parameter. In the base station 11a, which is the opposing device of the mobile station 12 after the handover, the communication parameter (or the determination result of the rain state) notified by the mobile station 12 is demodulated and passed to the rain state determination unit 24, which in turn sets this communication parameter (or the communication parameter corresponding to the rain state) in the modulation unit 22 and the demodulation unit 26. The notification of a communication parameter from the mobile station 12 to the base station 11a may be via an undepicted control station that controls a plurality of base stations, instead of the direct notification to the base station 11a.

Then, when the mobile station 12 enters the maximum rainy-weather communication area 15, the rain state determination units 24 of the base station 11a and the mobile station 12 indicate the modulation units 22 and the demodulation units 26 to use the clear-weather communication parameter regardless of the rain state.

Additionally, in the case where the period in which the parameter selection processing is performed is limited to the period in which the mobile station 12 is present in the maximum rainy-weather communication area 15, the base station that is the opposing device of the mobile station 12 may be configured to use, with respect to an undepicted first mobile station, which is different from the mobile station 12 present in a communication area other than the maximum rainy-weather communication area 15 of the base station, a communication parameter corresponding to the rain state determined on the basis of the communication with the mobile station 12, which is a second mobile station present in the maximum rainy-weather communication area 15 of the base station.

Additionally, in the case where the period in which the parameter selection processing is performed is limited to the period in which the mobile station 12 is present in the maximum rainy-weather communication area 15, the mobile station 12 and the base station to which the mobile station 12 is handed over (the base station 11a in FIG. 5) may be configured to change the communication parameter to be used by the mobile station 12, which is not present in the maximum rainy-weather communication area 15, according to the rain determination result of another mobile station that is present in the maximum rainy-weather communication area of the base station of the mobile station 12 before the handover (the base station 11b in FIG. 5). In this case, the base station that is the opposing device of the mobile station 12 (the base station 11a in FIG. 5) is notified of the rain determination results or a communication parameter determined in accordance with the rain determination results of the other mobile station described above and the base station that is the opposing device to the other mobile station (the base station 11b in FIG. 5) via an undepicted control station. If, while the mobile station 12 is moving outside the maximum rainy-weather communication area 15 after the handover, the determination result of rainfall or the communication parameter notified by the base station that is the opposing device (the base station 11a in FIG. 5) is changed, the mobile station 12 changes the communication parameter to be used in accordance with the rain determination result or the communication parameter notified by the base station that is the opposing device.

As described above, the present embodiment is configured to use a communication parameter based on the rain state determined in the communication with a base station different from the base station that is the opposing device of the mobile station 12 for the communication with the base station that is the opposing device. Thus, in the case where the section in which the parameter selection processing is performed is limited, the present embodiment can produce effects similar to those in the first embodiment or the second embodiment even when the directional antenna of a mobile station is installed in the same direction as the moving direction of the mobile station.

INDUSTRIAL APPLICABILITY

As described above, a mobile station, a base station, a wireless communication system, and a communication method according to the present invention are useful for a wireless communication system including a mobile station, and are particularly suitable for a wireless communication system installed outdoors.

REFERENCE SIGNS LIST 11a, 11b base station, 12 mobile station, 13a, 13b, 13c directional antenna, 21 antenna unit, 22 modulation unit, 23 reception power measurement unit, 24, rain state determination unit, 25 distance calculation unit, 26, 32 demodulation unit.

The invention claimed is:

1. A mobile station that communicates with a base station, the mobile station comprising:
   a distance calculation unit to calculate a distance between the mobile station itself and the base station;
   a reception power measurement unit to measure a reception power of a reception signal received from the base station;
   a transmission-path state determination unit to determine a transmission-path quality on a basis of a reception-power theoretical value corresponding to the distance and a reception power measured by the reception power measurement unit and select a communication parameter on the basis of the determined transmission-path quality; and
   a transmission processing unit to generate a transmission signal to be transmitted to the base station by using a communication parameter selected by the transmission-path state determination unit,
   wherein the transmission-path state determination unit retains, as candidates of the communication parameter, a first parameter, and a second parameter that is a parameter for performing communication capable of achieving a longer communication distance than communication using the first parameter, determines presence of rainfall, and selects the first parameter as the communication parameter when it is determined that there is no rainfall, the second parameter as the communication parameter when it is determined that there is rainfall, and the first parameter as the communication parameter regardless of the transmission-path quality in a maximum rain communication area that is an area in which communication with the base station is possible when there is rainfall with an assumed maximum quantity of rain.

2. The mobile station according to claim 1, wherein a section in which the transmission-path state determination unit is operated and a section in which the transmission-path state determination unit is not operated are determined, and the section in which the transmission-path state determination unit is operated is the maximum rainy-weather communication area.

3. The mobile station according to claim 2, wherein, when the mobile station moves from inside the maximum rainy-weather communication area to outside the maximum rainy-weather communication area, the transmission-path state determination unit switches from the first parameter to the communication parameter selected on the basis of the transmission-path quality at an end of the maximum rainy-weather communication area.

4. The mobile station according to claim 2, wherein the base station includes a first base station and a second base station, and in a case in which the mobile station performs handover from the first base station to the second base station and the mobile station is present outside the maximum rainy-weather communication area of the second base station at a point in time when the handover to the second base station is performed,
   if it is determined that there is rainfall by the determination of the transmission-path quality performed in the maximum rainy-weather communication area of the first base station, the transmission-path state determination unit sets the second parameter in the transmission processing unit when the mobile station performs the handover to the second base station, and sets the first parameter in the transmission processing unit when the mobile station enters the inside of the maximum rainy-weather communication area of the second base station.

5. The mobile station according to claim 2, wherein, after the mobile station moves for a predetermined distance or longer outside the maximum rainy-weather communication area, when a first signal indicating that the base station is using a communication parameter different from a communication parameter currently being used by the mobile station itself is received, or when a second signal notifying that a communication parameter is to be changed is received from the base station, the communication parameter currently being used by the mobile station itself is changed, on the basis of the first signal or the second signal received from the base station, such that it is identical with a communication parameter used by the base station.

6. The mobile station according to claim 2, wherein the transmission-path quality is determined when the mobile station itself is stopped for a predetermined time period or longer outside the maximum rainy-weather communication area.

7. The mobile station according to claim 1, wherein the mobile station receives from the base station information indicative of a result of determination performed by the base station regarding a transmission-path quality between the base station and the mobile station, and
   the transmission-path state determination unit selects a poorer transmission-path quality between the transmission-path quality indicated by the received information and the transmission-path quality determined by the mobile station itself, and selects the communication parameter on the basis of the selected transmission-path quality.

8. A base station that communicates with a mobile station, the base station comprising:
   a distance calculation unit to calculate a distance between the base station itself and the mobile station;

a reception power measurement unit to measure a reception power of a reception signal received from the mobile station;

a transmission-path state determination unit to determine a transmission-path quality on a basis of a reception-power theoretical value corresponding to the distance and a reception power measured by the reception power measurement unit and select a communication parameter on the basis of the determined transmission-path quality; and a transmission processing unit to generate a transmission signal to be transmitted to the mobile station by using a communication parameter selected by the transmission-path state determination unit, wherein the transmission-path state determination unit retains, as candidates of the communication parameter, a first parameter, and a second parameter that is a parameter for performing communication capable of achieving a longer communication distance than communication using the first parameter, determines presence of rainfall, selects the first parameter as the communication parameter when it is determined that there is no rainfall, and selects the second parameter as the communication parameter when it is determined that there is rainfall, and selects the first parameter as the communication parameter regardless of the transmission-path quality when the mobile station is present in a maximum rainy-weather communication area that is an area in which communication is possible when there is rainfall with an assumed maximum quantity of rain.

9. The base station according to claim 8, wherein a section in which the transmission-path state determination unit is operated and a section in which the transmission-path state determination unit is not operated are determined, and the section in which the transmission-path state determination unit is operated is the maximum rainy-weather communication area.

10. The base station according to claim 9, wherein, when the mobile station moves from inside the maximum rainy-weather communication area to outside the maximum rainy-weather communication area, the transmission-path state determination unit switches from the first parameter to the communication parameter selected on the basis of the transmission-path quality when the mobile station is present at an end of the maximum rainy-weather communication area.

11. The base station according to claim 9, wherein the mobile station includes a first mobile station and a second mobile station, and when the first mobile station is present outside the maximum rainy-weather communication area of the base station itself, and the second mobile station is present inside the maximum rainy-weather communication area of the base station itself, the communication parameter to be used for communication with the first mobile station is selected on the basis of a determination result of a transmission-path quality determined by the transmission-path state determination unit by using a reception signal received from the second mobile station.

12. The base station according to claim 9, wherein in a case in which the mobile station performs handover from another base station to the base station of its ownself, and the mobile station is present outside the maximum rainy-weather communication area at a point in time when the handover to the base station of its ownself is performed, the transmission-path state determination unit determines a communication parameter for the base station of its ownself on the basis of information indicative of a communication parameter used in the mobile station notified by the mobile station.

13. The base station according to claim 9, wherein the mobile station includes a first mobile station and a second mobile station, and when the first mobile station is present inside the maximum rainy-weather communication area of the base station itself, and the second mobile station is present outside the maximum rainy-weather communication area of the base station itself, the communication parameter to be used for communication with the second mobile station is selected on the basis of a determination result of a transmission-path quality determined by the transmission-path state determination unit by using a reception signal received from the first mobile station.

14. The base station according to claim 9, wherein the transmission-path quality is determined when the mobile station communicating with the base station itself is stopped for a predetermined time period or longer outside the maximum rainy-weather communication area.

15. The base station according to claim 8, wherein the base station receives from the mobile station information indicative of a result of determination performed by the mobile station regarding a transmission-path quality between the mobile station and the base station, and the transmission-path state determination unit selects a poorer transmission-path quality between the transmission-path quality indicated by the received information and the transmission-path quality determined by the base station itself, and selects the communication parameter on the basis of the selected transmission-path quality.

* * * * *